July 31, 1956  H. R. SCIVALLY  2,756,506
APPARATUS FOR MEASURING PERIODIC UNIDIRECTIONAL MOVEMENTS
Filed May 16, 1955  2 Sheets-Sheet 1
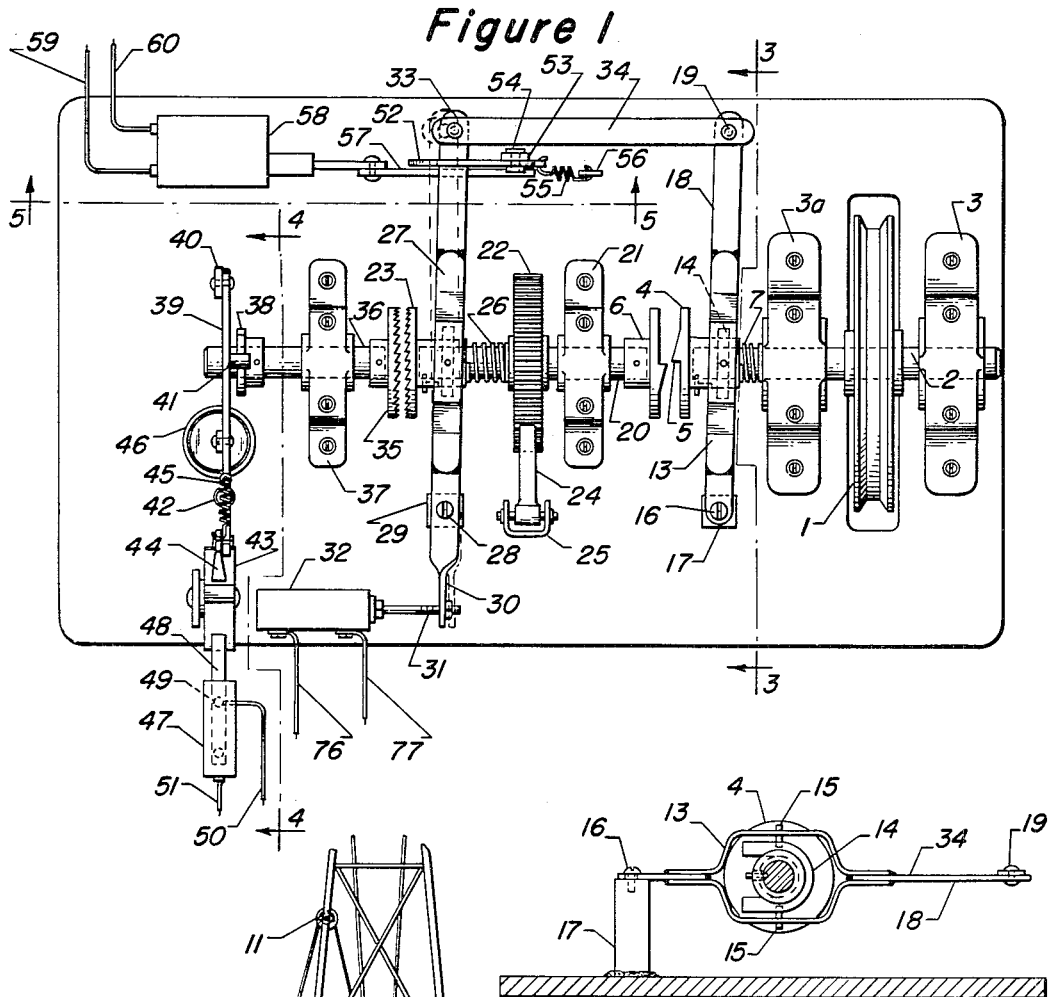
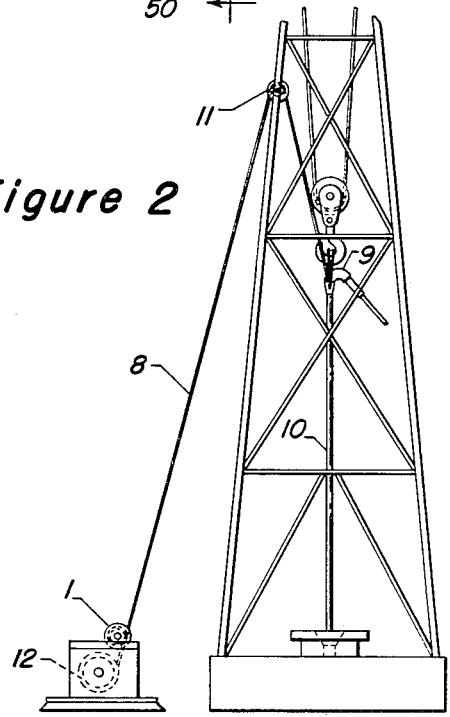
INVENTOR:
Herschell R. Scivally
By, Philip J. Liggett
ATTORNEY:

July 31, 1956  H. R. SCIVALLY  2,756,506
APPARATUS FOR MEASURING PERIODIC UNIDIRECTIONAL MOVEMENTS
Filed May 16, 1955  2 Sheets-Sheet 2

INVENTOR:
Herschell R. Scivally

By: *Philip J. Liggett*

ATTORNEY:

2,756,506

APPARATUS FOR MEASURING PERIODIC UNIDIRECTIONAL MOVEMENTS

Herschell R. Scivally, Shreveport, La.

Application May 16, 1955, Serial No. 508,688

4 Claims. (Cl. 33—134)

This invention relates to an improved form of measuring or sensing apparatus adapted to indicate increments of unidirectional movement. More particularly, the apparatus provides means for automatically indicating increments of linear movement, such as measuring the descent of a drill in a well drilling operation.

It is present day practice to use a well logging apparatus of one type or another with each oil well drilling rig in order that a permanent record or log sheet may be made of the time consumed for penetrating each foot, or other increment, of depth. The log in turn provides a record of the relative densities or degrees hardness of the various strata encountered by the drills. A desirable form of well logging apparatus has a measuring portion having means for attachment to the kelly of a drilling rig and for effecting the measurement of the increments of downward movements of the drill, as well as a timing and recording section for producing a graphic record of the drilling rate.

A preferred type of logging apparatus operates automatically to record the drilling rate on an inked graph or chart, showing the time required to drill each increment of depth. Also, a preferred construction and design provides a measuring section which automatically disengages itself from working in combination with the recording section when the drill pipe and drill is being raised in the drill-hole. Many of the present types of instruments in use with drilling rigs require various manual operations to effect, for example, the starting and stopping of the timing and the log paper turning mechanisms, and the connection and disconnection of the measuring section with the recording section as well as with the kelly, etc. These various necessary manual operations and adjustments in a logging apparatus usually result in errors and inaccuracies in the resulting log.

It is, therefore, a prime object of the present invention to provide an apparatus arrangement which senses and measures only unidirectional increments of linear movement. Further, it is an object of this invention to provide means for automatically cutting off the operation of an accompanying recording section, whereby periodic increments of linear movement may be recorded as an unbroken log.

The present improved apparatus is adapted and designed to operate as a measuring section of a well logging instrument, however, it may well be used for measuring periodic one-direction movements which are horizontal or inclined and not in any way connected with a drill stem or a bit for drilling wells. Additional advantages of the improved apparatus will be set forth and noted in connection with subsequent portions of the specification and upon reference to the drawings.

Briefly, the present improved apparatus for actuating recording of periodic unidirectional movements comprises, in combination, a rotatable measuring wheel connected by a rotatable shaft with a longitudinally slidable inclined face wedge wheel, a non-sliding inclined face wedge wheel attached to one end of a second rotatable shaft and opposing the aforementioned wedge wheel and adapted to engage and disengage therewith, a longitudinally slidable clutch member connecting to the other end of the second shaft whereby the clutch member is turned upon the engagement of the inclined face wedge wheels, and a non-sliding clutch member attached to one end of a third rotatable shaft and closely opposing the first mentioned clutch member whereby the clutch members may be engaged and disengaged and effect the rotation of said third rotatable shaft, cam means connecting with the latter and with actuating means whereby to effect the operation of recording means responsive to the rotation of said third shaft, means holding all of the rotatable shafts in axial alignment, a pivoted arm member connecting with the slidable clutch member and a linking bar connecting between said pivoted arm members whereby the movement of the slidable wedge wheel effects a corresponding movement of the slidable clutch member and resulting corresponding engagements and disengagements, a spring actuated locking means positioned adjacent to and operative to automatically engage a pivoted arm member in a manner holding the slidable clutch member disengaged following each disengaging movement, and means for releasing the aforesaid spring actuated locking means from the arm member.

A preferred embodiment of the measuring and actuating apparatus of this invention combines electrically operated means therewith so as to provide for the automatic operation of the measuring means and the automatic operation of logging and recording means directly responsive to movements in the measuring apparatus. In other words, a preferable construction and arrangement provides an electrical switch operating in connection with the cam means so that each revolution of the shaft effects, through electrical impulses, the movement of a log sheet or graph in a recording apparatus. Where depth is being measured, in connection with well drilling, the shaft and cam rotation effects, through the electrical switch, the automatic operation of a suitable electrical motor or other electrical operating means, and the desired movement of a suitable graph or chart paper in stepwise increments corresponding to units of linear measurement.

A suitable electrical switch may also be used in connection with the movement of the slidable clutch member to effect an electrical connection with the timing portion of the recording apparatus so that the timing section is automatically stopped and started with disengaging and engaging movements of the clutch members. Thus, the movement of a stylus or marking means connecting with the timing mechanism in the recording apparatus is likewise halted during periods of lifting drill pipe in the drilling rig, or during other periods of holding up the drilling operation.

Still another automatic electrical embodiment utilized in connection with the preferred construction and arrangement provides an electrically operated solenoid linked with the spring operated latching means on the pivoted arm member connecting with the slidable clutch member so that the latching means may be automatically released by a switch operated by a driller.

A further modification in connection with the automatic electrical release of the latching means which holds the clutch members disengaged is the provision of a latch type of push button switch for connection with the solenoid, such that during periods of continuous operation and measurement the driller's push button switch is latched in a closed position. A suitable relay operating in conjunction with the latch type of switch permits the latter to be released upon the disengagement of the clutch means and the stopping of the measuring apparatus and the stopping of the connecting recording apparatus. By use of a suitable electric circuit, the switching means in the measuring apparatus which starts and stops the timing mechanism of the recording section can, in turn, effect the release of the latch of the starting relay in the driller's starting switch.

The construction and operation of the present improved measuring apparatus may be more fully explained and understood by reference to the accompanying drawings and the following description in connection therewith.

Figure 1 in the drawing is a diagrammatic plan view of the arrangement and assembly of the principal portion of the measuring apparatus.

Figure 2 provides a diagrammatic elevational view of a means for connecting the measuring wheel of the improved apparatus with the kelly or drill pipe of a drilling rig.

Figure 3 is a sectional elevational view of a portion of the apparatus, as indicated by the line 3—3 shown in Figure 1 of the drawing.

Figure 5:
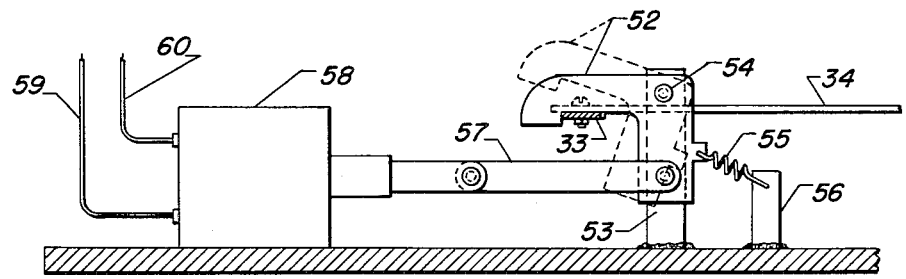

Figure 5 of the drawing shows in an elevational view, as indicated by the line 5—5 in Figure 1, the construction and arrangement of the latching mechanism operating to hold the slidable clutch member disengaged.

Figure 6:
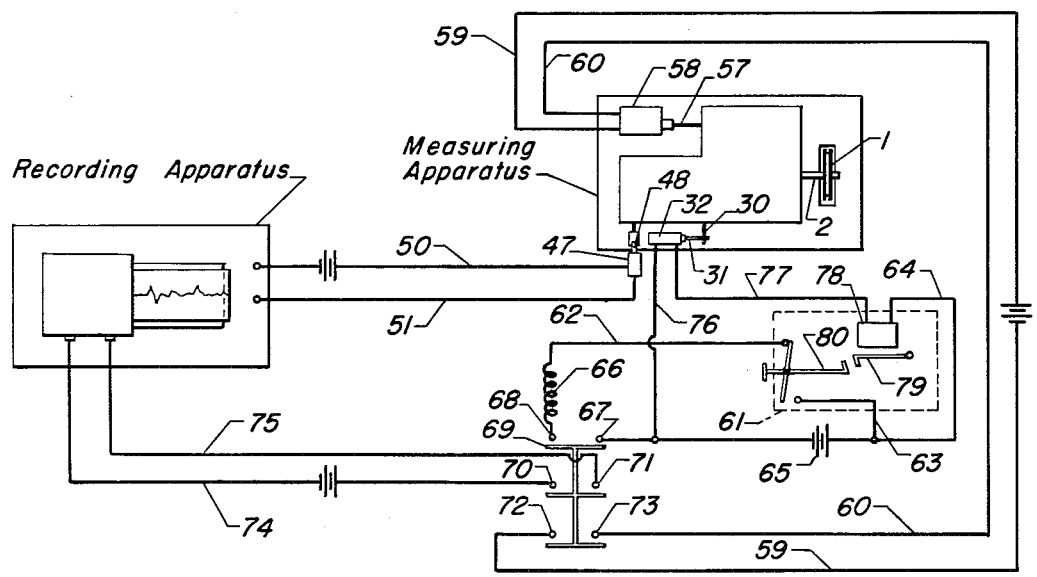

Figure 6 indicates diagrammatically a method for connecting the unidirectional measuring apparatus with a suitable recording apparatus whereby there is effected automatic operation of the combined apparatus arrangement.

Referring now specifically to Figures 1 and 2 of the drawing, there is shown a measuring wheel 1 mounted on a shaft 2, which in turn is supported by suitable bearings or pillow blocks indicated as 3 and 3a. Shaft 2 has a suitable slidable wedge wheel 4 attached at one end thereof. The wedge wheel 4 in turn has an inclined face which provides at least one offset portion 5 for engagement with an opposing inclined face wedge wheel 6. A suitable compression spring 7 is mounted around shaft 2 in the space between the pillow block 3a and the bearing portion of the slidable wedge wheel 4, such that the latter pushes back and compresses the spring 7 as it is turned clockwise and slides across the face of the opposing wedge wheel 6 and becomes disengages therewith.

By reference to Figure 2 of the drawing, it will be noted that the measuring apparatus is best connected with the kelly or drill stem of a rotary drilling rig by means of a cable 8. In this embodiment the cable 8 connects with the gooseneck 9 at the top of the kelly 10 and then passes over a suitable pulley 11 at the side of the rig and on around the measuring wheel 1 of the measuring apparatus to eventually connect with a spring wound drum mounted below the measuring apparatus. The measuring wheel 1 is preferably V grooved and has a predetermined circumference so that the cable 8 can be wrapped once around prior to connecting with the spring wound drum 12. Thus, there is movement of the cable corresponding with each up and down movement of the kelly and drill stem in the drilling rig, and the periphery of the measuring wheel is turned the corresponding amount. When the measuring wheel has a circumference of one foot, then one foot of movement of the drill stem end of the cable 8 provides a movement of one revolution of measuring wheel 1. The use of a spring wound drum for the cable, such as the drum indicated as 12 in the diagrammatic drawing, permits the cable to be automatically let out or reeled in as sections of drill pipe are lowered or raised during the drilling operation. In oil well drilling, sections of drill pipe are usually lowered one at a time so that the kelly moves downwardly for a distance of about 30 feet and then is raised upwardly to insert another section of drill pipe and then is again lowered as the drilling proceeds. In view of these continuous and repeated operations of raising and lowering it is a feature of the present invention to provide means for disconnecting the operation of the recording section of a well logging operation so that there is a resulting single line graph indicating the rate of penetration of the drill bit at all depths, without errors entering into the chart because of the two way movement of the drill stem and of the kelly.

As is shown in elevation in Figure 3, as well as in Figure 1 of the drawing, a suitable yoke 13 is connected to and provided around the hub or bearing portion of the slidable wedge wheel 4 which in turn attaches to shaft 2. The yoke 13 is connected to the wheel 4 by means of pins 15 and a slidable collar 14 which is mounted in a circumferential groove on the hub portion of wedge wheel 4. The collar 14 fits into the circumferential groove in a manner permitting the wheel 4 to rotate with the shaft 2. However, a suitable pin or key and a longitudinal slot provided between the shaft 2 and the hub portion of wheel 4 permits the latter to slide back and forth longitudinally on the end of shaft 2 within limits, as is necessary for the disengagement and engagement in the wedge wheels 4 and 6. One end of the yoke 13 connects through pivot means 16 at the top of a post 17 so that as a result one end of the yoke arrangement is vertically and laterally fixed in a pivoting connection. The other end of the yoke 13 connects with a suitable arm 18 which in turn has pivot means 19, at its outer extremity, that is free to move back and forth in a manner corresponding with the longitudinal movements of the wedge wheel 4 with respect to the end of the shaft 2. In the particular embodiment shown, the sloping or inclined face portions of the wedge wheels 4 and 6 are arranged such that a clockwise movement of the measuring wheel 1 and of the shaft 2, with respect to Figure 2 of the drawing, will effect the disengagement of the wedge wheels 4 and 6 from one another.

The wedge wheel 6 is fixedly connected to a shaft 20 which in turn passes through a suitable bearing or pillow block 21 and connects on its opposing side with a notched wheel 22 and a slidable clutch member 23. The notched or toothed wheel 22 in turn has an opposing dog member 24 pivotally connected with a post 25 and operates to prevent the turning of shaft 20 in any direction other than the engaged position with respect to wedge wheels 4 and 6. In other words, shaft 20 can only be turned in a counter-clockwise direction, with the dog member 24 riding free over the notched wheel as it is turned counter-clockwise and engaging a tooth and preventing the turning of shaft 20 as the latter tends in any manner to be turned in a clockwise manner.

In a construction and arrangement similar to that shown in Figure 3, with respect to the wedge wheel 4, the slidable clutch member 23 is mounted at the end of shaft 20 such that it may move longitudinally on the end of the shaft 20 by the action of the yoke 27 pivotally connected with the bearing or hub portion of the clutch member 23. One end of the yoke member 27 connects at a pivot means 28 with the top of a post 29 so that vertical and lateral movement is precluded and only pivotal motion is permitted. An extension arm 30 connecting with yoke 27 projects beyond the pivot point 28 and has a contact member 31 connecting therewith. Contact member 31 effects the electrical making and breaking of micro switch 32. The operation of the switch 32 in an automatic electrical circuit between the measuring apparatus and a recording means will be further explained hereinafter. The other end of yoke member 27 connects with an arm member 33 which in turn has its outer end pivotally connecting with a linking bar 34. The linking bar or arm 34 connects with the outer end of the arm 18 on yoke 13 and causes the arm 33 and yoke member 27 to move in a manner corresponding to the movements of arm 18 and yoke 13 at the slidable wedge wheel 4. A suitable compression spring 26, mounted around shaft 20 between the toothed wheel 22 and the hub portion of clutch member 23 such that the latter is normally urged to a position at the outer end of the shaft 20. Thus spring 26 provides for the automatic engagement of the clutch member with an opposing clutch member 35 when the pull of the yoke member 27 against the end of the spring 26 is released.

Clutch member 23 has notches or teeth designed and arranged to engage with corresponding notches or teeth on the clutch member 35. The latter is connected with the shaft 36 which in turn passes through a suitable bearing or pillow block 37 and connects with a suitable cam member 38, whereby the latter is maintained in continuous rotation as long as the clutch members 23 and 35 remain engaged, but ceases rotation immediately upon the disengagement of the clutch members.

Figure 4:
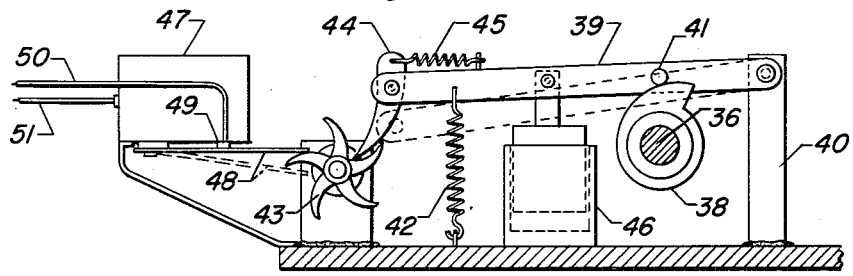
Figure 4 is likewise a sectional elevational view through a portion of the measuring apparatus, as indicated by the line 4—4 in Figure 1 of the drawing, and shows more specifically a means for effecting the operation of an electrical switch by a pivoted arm actuated by the movement of the cam.

Means for indicating and recording the measurement of distances, resulting in turn from the rotational movement of the cam member 38, is best shown in Figure 4 of the drawing, which is an elevational view of that portion of the apparatus. A pivoted arm member 39 connecting pivotally with a post 40 has a projecting rider 41 positioned directly above the cam member 38 and is designed and arranged to maintain continuous contact with the latter. The cam 38 preferably has a sharp break, such as indicated in Figure 4, so that the arm 39 moves gradually upwardly and then sharply and quickly downwardly after passing over the extreme outer portion of the cam 38. The arm 39 is pulled downwardly by spring 42 and in turn causes the rotation of a pronged wheel 43 by means of a suitable push arm 44. The latter is pivotally connected to the free end of the arm 39 and maintained in contact with the pronged wheel 43 by means of a suitable spring 45. It is to be noted that the present embodiment of the apparatus utilizes a dash pot 46 that is connected to and positioned below the pivoting arm 39 in order to somewhat dampen the sharp downward movement of the arm as the rider 41 moves over the break in the cam 38. It is also a feature of the embodiment illustrated to maintain a suitable electrically operated switch 47 having an actuating lever or arm 48 in contact with the pronged wheel 43. Each time that the pushing arm 44 turns the pronged wheel 43 a portion of a revolution, there is sufficient movement to cause one of the projections of the wheel 43 to raise the contact arm 48 of the switch 47 and make a contact therewith and effect electrical current flow. A preferred arrangement provides for the electrical operation of the recording instrument and the contact switch 47 of the present embodiment may be used to effect electrical recordation of lineal movement. It will be noted that the curved shape of the projections from the rotatable wheel 43 permits the switch contact arm 48 to be lifted gradually to make the contact with the point 39 and then permit the end of the contact arm 48 to slide over the outer end of the projection and rest in an open switch position until such time as the cam again permits the arm 39 to drop and the pushing arm 44 to again turn the wheel 43. Electrical lead lines 50 and 51 are indicated from switch 47, and as previously noted, are adapted to connect with the recording apparatus to effect a step by step turning of the log paper or other chart paper which is moved in unison with incremental measurements of distance or depth responsive to the measuring apparatus of this invention. One means for connecting the recording apparatus with the measuring apparatus and effecting automatic electrical operation is explained hereinafter in connection with Figure 6 of the drawing.

It is also a feature of the present invention to provide means for automatically locking the clutch members 23 and 35 in an open position during periods when measurements in the desired direction of movement are not being taken. As best shown in both Figure 1 and Figure 5 of the drawing, an angle shaped locking member 52 is provided to engage with the extension arm 33 on the yoke member 27 which in turn connects with the slidable clutch member 23. The lock member 52 pivotally connects with the end of the fixed post 53 by pivot means 54 in a corner zone of the angle member such that it acts in the manner of a rocker arm having its lower and outer ends free to oscillate back and forth. The upper and lateral portion of the lock arm 52 has a hooked portion designed and arranged to fit over the extension 33 and lock the latter in a fixed position when in contact therewith by means of the continuous tension supplied by spring member 55 which in turn connects with a post 56. The lower arm portion of lock member 52 pivotally connects with an arm 57 which in turn connects with an electrically operating solenoid member 58. A preferable construction and arrangement provides that the spring member 55 hold the locking arm 52 around the yoke arm 33 and in turn hold the clutch disengaged during periods of inoperation. Thus, during periods of operation and measurement, upon effecting the electrical energizing of the solenoid 58, the arm 57 is pulled toward the latter and the lower arm of the lock member 52 is pulled toward the solenoid to in turn effect the release of arm 33 and yoke 27. Electrical lead lines 59 and 60 are indicated connecting with the solenoid 58, and as will be hereinafter explained in connection with the electrical circuit shown in Figure 6.

Suitable manual means may of course be provided for tripping a lock arm 52 to hold the extension arm 33 and yoke 27 and clutch member 23 in an open position, however, an electrically operating solenoid provides a desirable automatic means for effecting the release of locking arm 52 by the mere push of a starting button. Also, various modifications may be made in the manner for indicating and recording the periodic movements of the pivoted arm 39, or other linkage, operating in conjunction with each rotation of the cam member 38. However, the provision of mechanically moving linking means such as provided by the present embodiment and set forth in Figure 4 of the drawing, provides one means for effecting an electrical contact responsive to each turn of shaft 36 and cam 38 to effect incremental turning of a suitable charting paper.

Referring now to Figure 6 of the drawing, there is indicated an electrical circuit arrangement to provide for linking the measuring apparatus automatically with recording means which embodies a suitable timing section and motor operating means to turn or move suitable graph or log paper. The measuring apparatus of the present invention is indicated diagrammatically in the wiring diagram and indicates a measuring wheel 1 which is turned responsive to a cable or other means connecting with a drill stem or kelly or other movable means which is to be subjected to linear measurement for the determination of its rate of movement. Other details of the apparatus are not shown except as to pertinent switching means which have been set forth and described in connection with the other figures of the drawing. During periods of operation and measurement the push button latch switch 61 is pushed to a closed or latched position which in turn effects the closing of the circuit between lines 62 and 63. Electrical line 63 in turn connects with line 64 and a battery or power source 65 so that there is an energizing of a coil 66 and a completion of the circuit across contact points 67 and 68 and operation of relay 69. This movement of relay 69 in turn effects the making of contacts between 70 and 71 and between 72 and 73. Suitable leads 74 and 75 from the contact points 70 and 71 connect with a suitable timing mechanism at the recorder section and effect the timed actuation of a suitable stylus or other marking means which may operate in conjunction with a recording chart or log sheet. Likewise, the operation of relay 69 to effect the making of a circuit between contact points 72 and 73 effects the completion of the circuit through lines 59 and 60 which connect the solenoid 58 to operate the release of the locking member 52. The release of the extension arm 33 at yoke 27 permits the compression spring 26 around shaft 20 to in turn urge the clutch member 23 into contact with clutch member 35 and the resumption of the turning of shaft 36 and cam member 38, to in turn bring about the step by step turning of the incremental measurements. As has been previously described, cam 38 effects the operation of switch contact arm 48 and the making and breaking of electrical switch 47. The latter, through lead lines 50 and 51, connects with a motor or other electrically energized means in the recording section to effect the step by step turning of the log paper therein. During the normal measuring period of the measuring apparatus, the micro-switch 32 is not closed and there is permitted the continuous operation of the timing mechanisms at the recording section. However, when the extension arm 30, connecting with the yoke member 27, is moved to make a contact with micro-switch 32, as may be brought about by the movement of yokes 13 and 27 when the wedge-shaped wheels 4 and 6 cause the corresponding disengagement of the clutch members, then the closing of micro-switch 32 effects a circuit through lines 76 and 77 and power source 65 in line 64 and through a solenoid means 78 in the latch type switch 61. In the latch switch 61, the energizing of coil 78 pulls back a pivoted latch arm 79 and effects a disengagement with latch arm 80 so that there is a breaking of the circuit between lines 62 and 63 at the switch. The breaking of the push button latch type switch 61 in turn releases the energizing force at relay 69 and the breaking of all contacts therein. Thus, the measuring apparatus is then operative to effect the stopping of the log paper and the timing mechanisms within the recording section. Likewise, as hereinbefore explained, when the wedge wheels 4 and 6 are separated and there is disengagement between clutch members 23 and 35, the latch member 52 around arm 33 at yoke 27 maintains the measuring apparatus inoperative during periods of no measurement. By virtue of the connecting arrangement of measuring wheel 1 with the specially designed wedge wheels 4 and 6 there is effected the immediate disengagement of the clutch members whenever the measuring wheel 1 is turned in any direction counter to the desired direction of measurement, with the result that only desired unidirectional measurements are maintained. It is to be noted, particularly by reference to Figure 2 of the drawing, that the winding of cable 8 around the measuring wheel 1 is such that as the kelly moves downwardly within the drilling rig the cable 8 is pulled upwardly with respect to the measuring wheel 1 and the latter is turned in a counter-clockwise direction. Thus, when the kelly is lifted or pulled up in the rig the cable is caused to move downwardly at the zone of the measuring wheel 1 and the latter turned in a clockwise direction to bring about the sliding of the face of wedge wheel 4 across the face of the wedge wheel 6 and the resulting disengagement of the clutch members.

It is also to be understood that the electrical circuit of Figure 6 of the drawing, showing the connection between the measuring apparatus and recording mechanism, is only diagrammatical and that various modifications and substitutions may be made in connection therewith. For example, Figure 6 indicates that several batteries or other power supply means are utilized in connection with various portions of the circuit, however, a single battery or power source may of course be utilized to connect with the various portions of the circuit to supply the desired power in the recording section. Also, in connection with the mechanical portions of the measuring apparatus, it is understood that various equivalent mechanical means may be provided in connection therewith. For instance minor modifications may be made in the design and arrangement of the various bearings, springs, linking mechanisms, etc., within the scope of the present invention.

I claim as my invention:

1. Apparatus for actuating the recording of periodic unidirectional movements, comprising in combination, a rotatable measuring wheel connected by a rotatable shaft with a longitudinally slidable inclined face wedge wheel, a non-sliding inclined face wedge wheel attached to one end of a second rotatable shaft and opposing the first said wedge wheel and adapted to engage and disengage therewith, a longitudinally slidable clutch member connecting to the other end of said second shaft whereby said clutch member is turned upon the engagement of said inclined face wedge wheels, a non-sliding clutch member fixed to one end of a third rotatable shaft and closely opposing the first said clutch member whereby said clutch members may be engaged and disengaged and effect the rotation of said third shaft, cam means connecting with said third shaft, actuating means engaging said cam means and effecting the operation of recording means responsive to the rotation of said third shaft, means holding all of said rotatable shafts in axial alignment, a pivoted arm member connecting with said slidable wedge wheel, a pivoted arm member connecting with said slidable clutch member and a linking bar connecting between said pivoted arm members whereby the movement of said slidable wedge wheel effects a corresponding movement of said slidable clutch member, a spring actuated locking means positioned adjacent to and spring operated to automatically engage a pivoted arm member and hold said clutch member disengaged upon each disengaging movement, and leverage means connecting with said locking means for disengaging said locking means from said arm member.

2. Apparatus for actuating the recording of periodic unidirectional movements, comprising in combination, a rotatable measuring wheel of predetermined circumference connected by a rotatable shaft with a longitudinally slidable inclined face wedge wheel, a non-sliding inclined face wedge wheel attached to one end of a second rotatable shaft and opposing the first said wedge wheel and adapted to engage and disengage therewith, a longitudinally slidable clutch member connecting to the other end of said second shaft whereby said clutch member is turned upon the engagement of said inclined face wedge wheels, a non-sliding clutch member fixed to one end of a third rotatable shaft and closely opposing the first said clutch member whereby said clutch members may be engaged and disengaged and effect the rotation of said third shaft, cam means connecting with said third shaft, electrical switching means engaging said cam means and adapted to effect the operation of recording means responsive to the rotation of said third shaft, bearing means holding all of said rotatable shafts in axial alignment, a pivoted arm member connecting with said slidable wedge wheel, a pivoted arm member connecting with said slidable clutch member and a linking bar connecting between said pivoted arm members whereby the movement of said slidable wedge wheel effects a corresponding movement of said slidable clutch member, spring means connecting with said slidable wedge wheel and said slidable clutch member and normally urging the engagement of said clutch members, a pivoted locking arm positioned adjacent to a pivoted arm member, and having a catch portion adapted to hold the latter, spring means connecting with said locking arm and operative to urge the engagement of the latter with the pivoted arm member and hold said clutch members disengaged upon each disengaging movement, an electrical solenoid connecting with reciprocatable leverage means in turn connecting with said locking means whereby to effect the disengagement of said locking means from said arm member.

3. The apparatus of claim 2 further characterized in that switching means connects with one of said pivoted arm members and electrical lead lines from the latter connect with said recording means whereby said switching means operates to stop said recording means upon each disengagement movement of said clutch members.

4. The apparatus of claim 2 further characterized in that an electrically operated solenoid connects with said pivoted locking arm in a manner opposing said spring means connecting therewith, whereby automatic electrical disengagement of said pivoted locking arm may be made with respect to said pivoted arm member to permit the engagement of said clutch members.

No references cited.